United States Patent [19]

Heyraud

[11] Patent Number: 4,661,733
[45] Date of Patent: Apr. 28, 1987

[54] DC MOTOR

[75] Inventor: Marc A. Heyraud, La Chaux-de-Fonds, Switzerland

[73] Assignee: Asgalium SA, Switzerland

[21] Appl. No.: 838,581

[22] Filed: Mar. 11, 1986

[30] Foreign Application Priority Data

Apr. 3, 1985 [CH] Switzerland .................. 1452/85

[51] Int. Cl.$^4$ ............................................ H02K 11/00
[52] U.S. Cl. .................................. 310/68 R; 310/72; 310/71; 310/268; 310/DIG. 6
[58] Field of Search ................. 310/71, 72, 68 R, 268, 310/DIG. 6

[56] References Cited

U.S. PATENT DOCUMENTS

| 3,056,056 | 9/1962 | Henry-Baudot | 310/268 X |
| 3,116,431 | 12/1963 | Henry-Baudot | 310/268 X |
| 4,093,897 | 6/1978 | Fujita et al. | 218/138 |
| 4,167,692 | 9/1979 | Sekiya et al. | 318/38 |
| 4,319,216 | 3/1982 | Ikeda et al. | 310/72 X |
| 4,396,850 | 8/1983 | Herr | 310/DIG. 6 X |
| 4,429,240 | 1/1984 | Kishi | 310/DIG. 6 X |

FOREIGN PATENT DOCUMENTS 583558 1/1973 Japan .

Primary Examiner—Donovan F. Duggan
Attorney, Agent, or Firm—Parkhurst & Oliff

[57] ABSTRACT

The motor comprises a flexible circuit composed of a substrate disposed in an air gap between the stator and the rotor, bearing a coating of copper etched to produce the various circuit components. Conductive paths carry the current to brushes soldered on zones of the circuit. Another path leads to further zones constituting shorted turns interconnected by striated areas constituting resistor elements.

5 Claims, 2 Drawing Figures

DC MOTOR

BACKGROUND OF THE INVENTION

This invention relates to electric motors, and more particularly to a DC motor of the type having a rotor provided with a commutator and a stator provided with brushes and supply terminals, and having an air gap contrived between the stator and the rotor.

Some motors of this type belong to a category in which one of the two parts, either the rotor or the stator, is provided with permanent magnets. Such motors are generally called electromechanical transducers. This is understood to mean a category of small, fractional horsepower motors used mainly in measuring, regulating, or control installations, or as sensing elements. The supply voltage is usually relatively low, and the windings are often made up of very fine insulated wires.

A number of difficulties are encountered in the manufacture of such motors owing to the small size of the various elements to be assembled, and especially to the fineness of the winding wires. The ends of these wires must frequently be connected to wires of larger diameter constituting the current leads connecting the windings to the input terminals. Other difficulties are involved in the positioning of the coils and in mounting them in such a way that the air gap is as narrow as possible.

Furthermore, a distinction is made between commutator motors in which the rotor bears coils and motors in which the coils are fixed, the rotor is provided with permanent magnets, and the current reversal is controlled by electronic means comprising detectors of the orientation of the rotor.

In the category of motors with permanent magnet rotors, it is known to be possible to use substrates bearing patterns of printed conductors for performing certain functions, especially the connection of the stator coils to the supply terminals, or the measurement of the speed of rotation of the rotor (cf. German Laid-Open Application No. 26 47675, Japanese Laid-Open Application No. 58-3558, and French Pat. No. 2,369,728).

SUMMARY OF THE INVENTION

It is an object of this invention to provide an improved DC motor of significantly simplified structure having better performance than prior art motors of the same type.

To this end, in the DC motor according to the present invention, the improvement comprises a stator including a thin substrate bearing a pattern of printed conductors, at least part of this pattern, disposed in the air gap, being arranged in such a way as to ensure one of the following functions: the connection between the supply terminals and the brushes, the attenuation of voltage surges upon commutation, or the setting-up of a resistor. This resistor may serve the purpose of speed control.

BRIEF DESCRIPTION OF THE DRAWINGS

A preferred embodiment of the invention will now be described in detail with reference to the accompanying drawings, in which.

DETAILED DESCRIPTION

Figure 1:
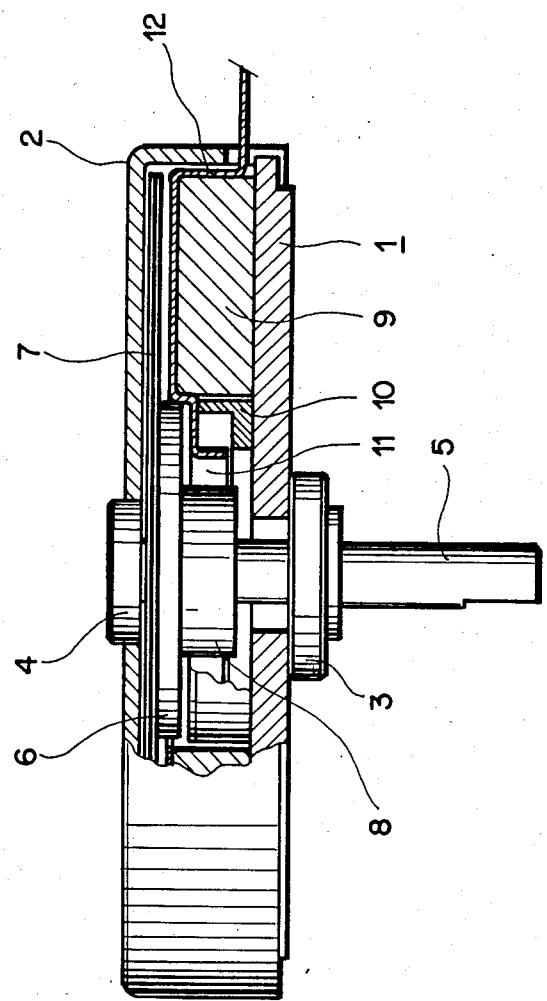
FIG. 1 is a side elevation, partly cut away and in section, of a motor.

The motor shown in FIG. 1 is of the commutator type, having a rotor comprising a series of flat coils distributed about its axis. This motor comprises a housing composed mainly of a plate 1 having a cover 2 fitted over it. Plate 1 bears a bearing 3, while cover 2 bears a bearing 4 coaxial with bearing 3, the arbor 5 of the rotor being supported by these two bearings. A circular flange 6 of plastic material is integral with arbor 5 for fixing, in a plane perpendicular to the axis of the rotor, a series of flat air-core coils 7 distributed about the axis of arbor 5 and constituting the motor windings. The rotor further comprises a commutator 8 of conventional design which need not be described in detail. Commutator 8 is made up of parallel segments insulated from one another and each connected to a point of the winding situtated between two coils.

The stator components of the motor are supported by plate 1. They comprise essentially an annular multipole magnet 9 including a number of pairs of poles corresponding to the number of coils of winding 7. Thus, each coil of winding 7 and each pair of poles of magnet 9 extends over a sector-shaped zone, these zones as a whole forming an annulus surrounding the axis of arbor 5. The magnet axes of multipole magnet 9 are parallel to one another, parallel to the axis of arbor 5, and distributed about that arbor. Components 1 and 2 of the motor close the magnetic circuit of the magnet. The stator further comprises an annular support member 10 seated within magnet 9. Mounted on member 10 are elements (not shown) which press brushes 11 against commutator 8. Finally, the stator comprises a flexible circuit 12 made up of a substrate of thin insulating material on which there is formed by means of the printed circuit technique an electric circuit performing various functions in the motor.

Figure 2:
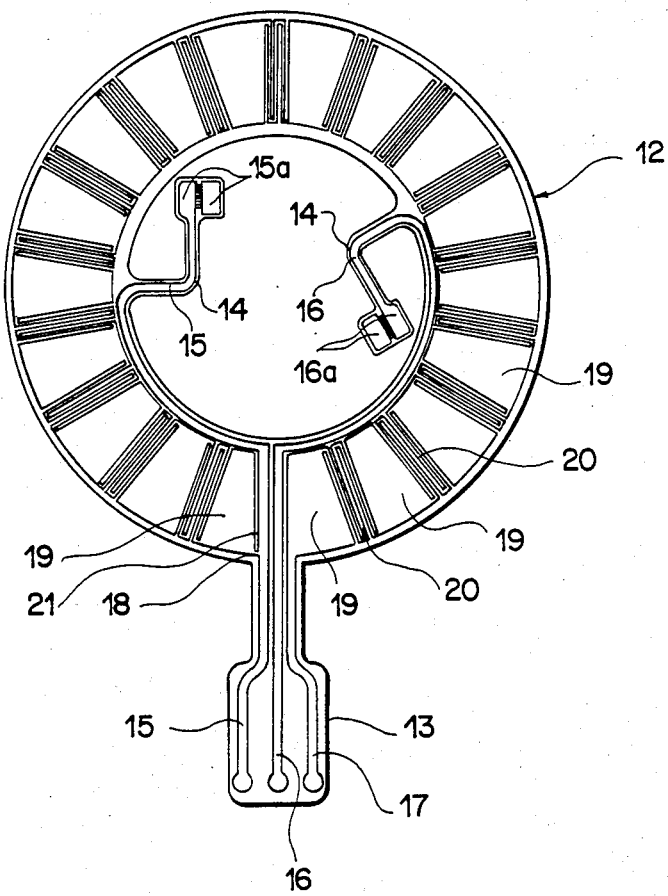
FIG. 2 is a top plan view of a flexible substrate bearing a printed circuit incorporated in the motor.

The details of flexible part 12 and the form of the circuit are shown in FIG. 2. Substrate 12 is seen to have an annular shape with an outer radial tongue 13 and two bent inner tongues 14 disposed symmetrically relative to the center of substrate 12 which, when the latter is in place, coincides with the axis of the motor. The printed circuit on substrate 12 comprises, firstly, three paths 15, 16, 17 which are printed on tongue 13. Two of these paths (15 and 16) constitute the feed connections of winding 7; these two paths run radially parallel to the inner edge of substrate 12, then they each run arcuately along that inner edge to one of the tongue 14, which they cover to the end of it. Paths 15 and 16 end in spread-out zones 15a, 16a which, as may be seen in FIG. 1, are soldered to brushes 11. The third path, 17, joins a circuit which extends over the annular portion of substrate 12 all around the motor and is connected at a junction 18 to tongue 15. This circuit, formed by etching on a thin coating of copper deposited on substrate 12, comprises a series of solid zones 19 in the shape of a sector whose degree of opening is the same as that of each of the coils of winding 7 and of each of the pairs of poles of magnet 9. Zones 19 are interconnected in series by striated areas 20 comprising perforated portions and each separating two zones 19, in which areas the portions from which the copper has been eliminated form radial bars disposed very close to one another, running alternately from the inner edge and the outer edge of the copper coating borne by substrate 12. Thus, two zones 19 are interconnected by a narrow zigzag path formed of radial elements connected to one another alternately at their inner ends and their outer ends. As may be seen in FIG. 2, the last zone 19 adjacent to junction 18 is separated from path 15 by a single radial stria 21 running almost up to the outer limit of the copper coating on substrate 12 so as to form junction 18. Substrate 12 is mounted on magnet 9, in the air gap. It may, for example, be made of a film of the dielectric material sold under the trade name "KAPTON" having a thickness of 25 microns and bearing a layer of copper, 35 microns thick or thicker, in which the described circuit is etched.

Zones 19 are intended to act similarly to a shorted turn inserted in the motor. By means of a transformer effect, these zones make possible an attenuation of the voltage surges in the winding and cause an apparent reduction of the inductance of the winding. The presence of these zones therefore leads, among other things, to a significant increase in the life of the commutator and the brush.

Furthermore, connecting areas 20 are intended to replace the insertion of a precision resistor in series with the winding of the motor for the purpose of regulating the speed of rotation of the motor. The surfaces which must be covered by zones 19 in order to produce the shorted-turn effect are small enough so that there is enough room in the intervening areas to etch narrow radial paths capable of constituting resistors connected in series with the winding and with the shorted turns.

Part 12 as a whole thus forms a unitary component, the manufacture of which is simplified inasmuch as it requires only a single mask during etching of the copper coating borne by substrate 12, which component can be accommodated in a small space within the motor. Moreover, owing to this position in the air gap and to judicious dimensioning, it is possible to improve the precision of the speed control produced by the series resistor. The insertion of a resistor in series with the winding of the motor is known to make possible, under the usual conditions, a certain regulation of the speed; but this regulation is of limited precision, above all because of the temperature differences which may occur between the resistor and the winding. Now, with the arrangement described above, in which the resistor is situated directly in the air gap of the motor, the temperature of the series resistor is constantly the same as that of the motor winding. It is possible, in fact, to have thermal time constants which are very close to one another for the two parts of the winding. What is more, when a difference in temperature occurs, it is rapidly compensated for by the heat exchange between the two parts of the winding. This arrangement likewise constitutes an effective shield against thermal shocks which may be brought about through outside causes.

Summing up, the arrangement described above represents a design improvement in DC commutator motors by simplifying construction and reducing its cost, and at the same time an operational improvement inasmuch as there is better stabilization of the speed.

What is claimed is:

1. A DC motor comprising:
   a rotor, said rotor including winding means and a commutator;
   a stator, said stator including brushes and supply terminals, and a thin substrate bearing a printed pattern of conductors;
   an air gap between said rotor and said stator, said thin substrate located adjacent said air gap;
   said printed pattern comprising paths connecting said brushes to said supply terminals, at least one solid zone forming a shorted turn, and at least one split area formed so as to constitute resistor means;
   wherein each solid zone is connected in series with a split area between said supply terminals.

2. The DC motor of claim 1, wherein said air gap is a planar space and said winding means comprises a plurality of flat coils distributed about the axis of the motor, said thin substrate comprising an annular portion facing said coils and including a plurality of said solid zones alternating with a plurality of said split areas around the periphery of said annular portion.

3. The DC motor of claim 2, wherein the dimensions of each of said solid zones correspond to the surface area of one of said coils.

4. The DC motor of claim 2, wherein each of said split areas includes a plurality of narrow radial paths disposed in proximity to one another and connected in series.

5. The DC motor of claim 2, wherein the printed pattern on said thin substrate includes first and second circuits, said first circuit including said brushes and acting as a feeding circuit for said winding means, said second circuit comprising said solid zones and said split areas and acting as a regulating and absorbing circuit.

* * * * *